(12) United States Patent
Tominaga et al.

(10) Patent No.: US 11,585,352 B2
(45) Date of Patent: Feb. 21, 2023

(54) SEAL STRUCTURE OF DRIVE DEVICE

(71) Applicant: TOYOTA JIDOSHA KABUSHIKI KAISHA, Toyota (JP)

(72) Inventors: Satoshi Tominaga, Susono (JP); Daisuke Tokozakura, Susono (JP); Yuki Iwama, Fuji (JP); Hiroyuki Shibata, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 20 days.

(21) Appl. No.: 17/365,404

(22) Filed: Jul. 1, 2021

(65) Prior Publication Data

US 2022/0018354 A1 Jan. 20, 2022

(30) Foreign Application Priority Data

Jul. 16, 2020 (JP) .............................. JP2020-122349

(51) Int. Cl.
*F04D 29/10* (2006.01)
*F04D 25/06* (2006.01)
*F16J 15/34* (2006.01)
*F16J 15/447* (2006.01)

(52) U.S. Cl.
CPC ....... *F04D 29/106* (2013.01); *F04D 25/0626* (2013.01); *F16J 15/3404* (2013.01); *F16J 15/447* (2013.01)

(58) Field of Classification Search
CPC . F04D 29/106; F04D 25/0626; F16J 15/3404; F16J 15/447; F16J 15/3204; F16J 15/34; F16J 15/4472; F16J 15/002; F16J 15/164; F16J 15/3252; F16C 19/54; F16C 19/546; F16C 33/7846; F16C 33/7853; F16C 33/7886; F16C 33/7896; F16C 33/80; F16C 19/06; F16C 33/7806
USPC ........................................................ 418/104
See application file for complete search history.

(56) References Cited

U.S. PATENT DOCUMENTS 5,174,583 A * 12/1992 Orlowski ............. F16J 15/4474
  277/421
5,687,612 A 11/1997 Imamura
11,155,161 B2 * 10/2021 Makino ................ B60K 17/145
(Continued)

FOREIGN PATENT DOCUMENTS

JP H08-230489 A 9/1996
JP 2000-142135 A 5/2000

*Primary Examiner* — J. Todd Newton
(74) *Attorney, Agent, or Firm* — Oliff PLC

(57) ABSTRACT

A seal structure of a drive device is provided which includes a case in which a motor chamber for accommodating an electric motor and a gear chamber for accommodating a gear mechanism are located adjacent to each other, a partition that separates the motor chamber and the gear chamber, a bearing that supports a rotating shaft, a seal part that seals between the rotating shaft and the partition, a lubricating oil that lubricates the gear mechanism, and a coolant that cools the electric motor, and also includes a first bearing on the motor chamber side, a second bearing on the gear chamber side, a first seal part on the motor chamber side, a second seal part on the gear chamber side, and at least the second seal part of the first seal part and the second seal part is provided between the first bearing and the second bearing.

5 Claims, 6 Drawing Sheets

(56) References Cited

U.S. PATENT DOCUMENTS

| | | | |
|---|---|---|---|
| 2011/0239818 A1* | 10/2011 | Kasuya | F16D 25/123 903/902 |
| 2014/0262674 A1* | 9/2014 | Saito | F16D 25/083 192/70.11 |
| 2014/0262675 A1* | 9/2014 | Sugiyama | F16H 57/0473 192/85.01 |

* cited by examiner

SEAL STRUCTURE OF DRIVE DEVICE

CROSS-REFERENCE TO RELATED APPLICATION(S)

The present application claims priority to and incorporates by reference the entire contents of Japanese Patent Application No. 2020-122349 filed in Japan on Jul. 16, 2020.

BACKGROUND

The present disclosure relates to a seal structure of a drive device.

Japanese Laid-open Patent Publication No. 2000-142135 discloses, in a drive device including an electric motor and a gear mechanism accommodated in a case, a structure in which a motor chamber for accommodating the electric motor and a gear chamber for accommodating the gear mechanism are located adjacent to each other through a partition, the motor chamber is a dry chamber, and the gear chamber is a wet chamber. In the configuration described in Japanese Laid-open Patent Publication No. 2000-142135, an oil seal is used to seal between the gear chamber and the motor chamber to prevent a lubricating oil of the gear chamber from entering the motor chamber.

SUMMARY

There is a need for providing a seal structure of a drive device that can prevent a coolant in a motor chamber and a lubricating oil in a gear chamber from mixing together.

According to an embodiment, a seal structure of a drive device includes: an electric motor; a rotating shaft that rotates together with a rotor of the electric motor; a gear mechanism connected to the rotating shaft; a case in which a motor chamber for accommodating the electric motor and a gear chamber for accommodating the gear mechanism are located adjacent to each other; a partition that has a through hole into which the rotating shaft is inserted and separates the motor chamber and the gear chamber in the case; a bearing that is attached to the partition to rotatably support the rotating shaft inserted in the through hole; a seal part that is arranged in line with the bearing in an axial direction of the rotating shaft to seal between the rotating shaft and the partition; a lubricating oil that lubricates the gear mechanism inside the gear chamber; and a coolant that cools the electric motor inside the motor chamber, the coolant being a different type of liquid from the lubricating oil. Further, the bearing includes a first bearing located on the motor chamber side with respect to the through hole, and a second bearing located on the gear chamber side with respect to the through hole, the seal part includes a first seal part, and a second seal part located on the gear chamber side with respect to the first seal part, and at least the second seal part of the first seal part and the second seal part is provided between the first bearing and the second bearing.

DETAILED DESCRIPTION

In the configuration described in Japanese Laid-open Patent Publication No. 2000-142135, the electric motor is cooled by air because the motor chamber is a dry chamber. In order to increase the cooling effect of the electric motor, it is possible to supply a coolant to the motor chamber to cool the electric motor by the coolant. In adopting the liquid-cooling structure, in addition to improvement in cooling efficiency of the electric motor, in order to reduce agitation resistance of the gear mechanism, it is possible to use different types of liquids in the motor chamber and the gear chamber, for example, use a coolant specializing in cooling properties in the motor chamber, and use a lubricating oil in the gear chamber. In this case, since the partition separates the motor chamber and the gear chamber and a rotating shaft passes through the partition, it is necessary to prevent the coolant on the motor chamber side from mixing with the lubricating oil on the gear chamber side through a clearance between the partition and the rotating shaft.

Specific descriptions are provided below of a seal structure of a drive device according to embodiments of the present disclosure with reference to drawings. Note that the present disclosure is not limited to the embodiments described below.

First Embodiment

A drive device in a first embodiment is described with reference to FIGS. 1 and 2.

Figure 1:
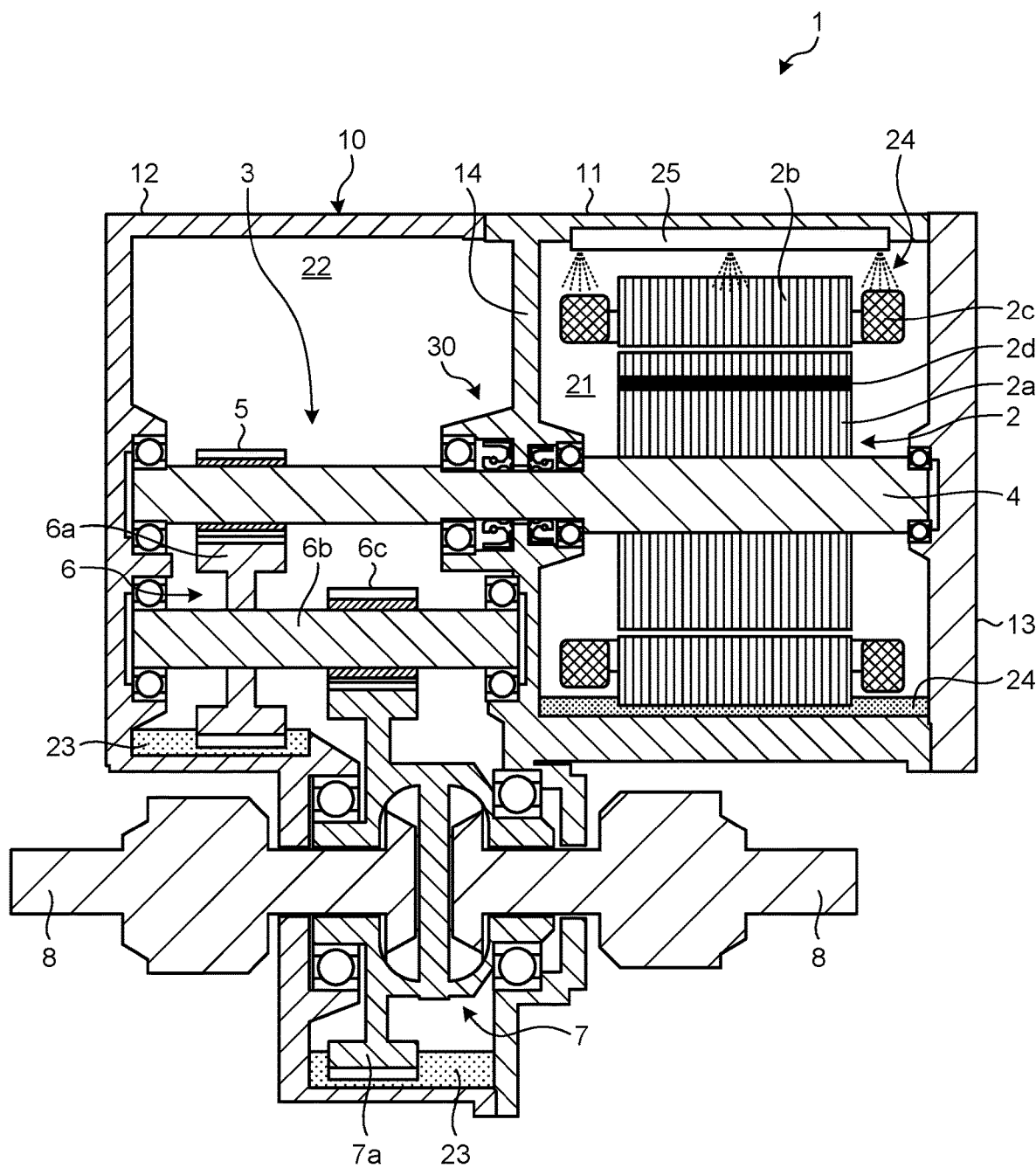
FIG. 1 is a schematic diagram schematically illustrating a drive device according to a first embodiment.

As illustrated in FIG. 1, a drive device 1 includes a motor 2, a gear mechanism 3, and a case 10. The drive device 1 is an electric unit in which the motor 2 and the gear mechanism 3 are accommodated inside the case 10. The motor 2 and the gear mechanism 3 are connected by a rotating shaft 4 to transmit power. Further, the gear mechanism 3 includes an output gear 5, a counter gear mechanism 6, and a differential gear mechanism 7. Then, power outputted from the motor 2 is transmitted to a drive shaft 8 through the gear mechanism 3. For example, in a case where the drive device 1 is mounted on a vehicle, wheels are connected to the drive shaft 8.

The case 10 includes a first case member 11, a second case member 12, and a cover member 13. The first case member 11 is a housing member for delimiting a motor chamber 21 in which the motor 2 is accommodated. The first case member 11 is integrally formed with a partition 14 that separates the motor chamber 21 and a gear chamber 22. The first case member 11 has, on one side, the partition 14 in the axial direction of the rotating shaft 4, and opens, on the other side, in the axial direction of the rotating shaft 4. The second case member 12 is a housing member for delimiting the gear chamber 22 in which the gear mechanism 3 is accommodated. The second case member 12 is bolted to the first case member 11 on the partition 14 side of the first case member 11. In the case 10, the motor chamber 21 and the gear chamber 22 are located adjacent to each other. Further, the cover member 13 is a member for covering an opening of the first case member 11. The first case member 11 is bolted to the cover member 13.

The motor 2 includes a rotor 2a and a stator 2b. The rotor 2a rotates together with the rotating shaft 4. In other words, the rotating shaft 4 functions as a rotor shaft of the motor 2. The stator 2b is fixed to the first case member 11. A stator coil 2c is wound around a teeth part of the stator 2b. The stator coil 2c is electrically connected to an inverter. The motor 2 is electrically connected to a battery through the inverter. The motor 2 is driven by electric power supplied from the battery. Further, the motor 2 can also function as a generator. Further, a permanent magnet 2d is embedded in the rotor 2a.

The rotating shaft 4 passes through the partition 14 to extend to the motor chamber 21 and the gear chamber 22. An output gear 5 is provided in a shaft part of the rotating shaft 4 on the gear chamber 22 side. The rotating shaft 4 transmits the power outputted by the motor 2 to the gear mechanism 3.

The output gear 5 includes a pinion gear that rotates together with the rotating shaft 4. The output gear 5 meshes with a counter driven gear 6a of a counter gear mechanism 6. The counter gear mechanism 6 includes the counter driven gear 6a and a counter drive gear 6c provided on a counter shaft 6b. The counter drive gear 6c meshes with a differential gear 7a of a differential gear mechanism 7. Then, the differential gear mechanism 7 is coupled to the drive shaft 8. The power outputted from the motor 2 is transmitted to the drive shaft 8 through the gear mechanism 3.

Further, the gear chamber 22 contains a lubricating oil 23 for lubricating the gear mechanism 3. The lubricating oil 23 is a liquid specializing in lubrication properties. The lubricating oil 23 is kept in a reservoir formed in the second case member 12. For example, the counter driven gear 6a and the differential gear 7a contact the lubricating oil 23 kept in the reservoir. Then, as the gear mechanism 3 rotates, the lubricating oil 23 in the reservoir is scooped up by the counter driven gear 6a and the differential gear 7a. The gear mechanism 3 is lubricated by scoop based lubrication in the gear chamber 22.

Further, the motor chamber 21 contains a coolant 24 for cooling the motor 2. The coolant 24 is a liquid specializing in cooling properties and has electrical insulation properties. The coolant 24 is sprayed to the motor 2 from a cooling pipe 25 provided in a ceiling part of the first case member 11. The cooling pipe 25 is located above the stator 2b and is provided with a plurality of supply ports from which the coolant 24 is sprayed or dripped. The coolant 24 supplied above the stator 2b flows downward by gravity and flows also to the rotor 2a located inside the stator 2b. The coolant 24, which has cooled the stator 2b, the stator coil 2c, and the rotor 2a, then flows to a bottom of the first case member 11. The bottom has a discharge port for discharging the coolant 24 outside the case 10. Specifically, the coolant 24 circulates in a circulation circuit and is cooled by a heat exchanger such as a radiator located outside the case 10. The coolant 24 cooled by the radiator is supplied to the motor chamber 21 through the cooling pipe 25.

Figure 2:
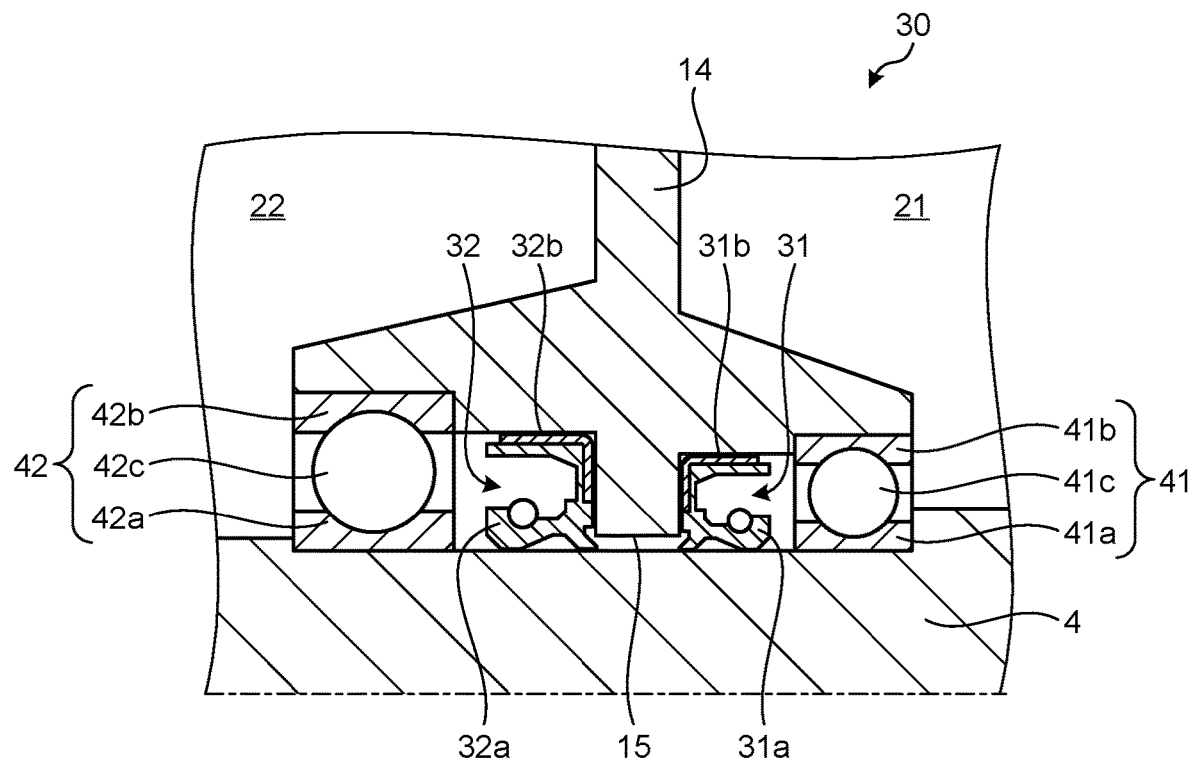
FIG. 2 is a diagram for explaining a seal structure in the first embodiment.

As illustrated in FIG. 2, the partition 14 for separating the motor chamber 21 and the gear chamber 22 has a through hole 15 into which the rotating shaft 4 is inserted. The rotating shaft 4 extends to the motor chamber 21 and the gear chamber 22 through the through hole 15. Further, the rotating shaft 4 inserted in the through hole 15 is supported rotatably with respect to the case 10 by a first bearing 41 and a second bearing 42 near the through hole 15.

Then, in the radial direction of the rotating shaft 4, a clearance is formed between the rotating shaft 4 and the through hole 15. For this reason, the case 10 has such an internal structure that movement of a liquid via the through hole 15 between the motor chamber 21 and the gear chamber 22 is controlled and the coolant 24 in the motor chamber 21 does not mix with the lubricating oil 23 in the gear chamber 22. In view of this, the drive device 1 has a seal structure 30 for sealing between the rotating shaft 4 and the partition 14.

The seal structure 30 includes a first seal part for preventing the coolant 24 from moving to the gear chamber 22 side and a second seal part for preventing the lubricating oil 23 from moving to the motor chamber 21 side. The first seal part and the second seal part are arranged side by side in the axial direction of the rotating shaft 4.

As illustrated in FIG. 2, the seal structure 30 of the first embodiment includes a first oil seal 31 and a second oil seal 32. The first oil seal 31 functions as the first seal part. The second oil seal 32 functions as the second seal part.

The first oil seal 31 is an oil seal that is provided between the first bearing 41 and the second bearing 42 and is located on the motor chamber 21 side with respect to the through hole 15. The first oil seal 31 includes a seal lip part 31a contacting the rotating shaft 4 and a metal ring 31b contacting the partition 14. This allows the first oil seal 31 to seal between the rotating shaft 4 and the partition 14 on the motor chamber 21 side.

Further, the first oil seal 31 is so attached that the seal lip part 31a is located on the motor chamber 21 side and a dust lip is located on the gear chamber 22 side. Thus, even if the coolant 24 in the motor chamber 21 enters a space on the gear chamber 22 side with respect to the first bearing 41, the first oil seal 31 prevents the coolant 24 from further moving to the gear chamber 22 side. In short, the first oil seal 31 prevents the coolant 24 from moving to the gear chamber 22 side.

Figure 3:
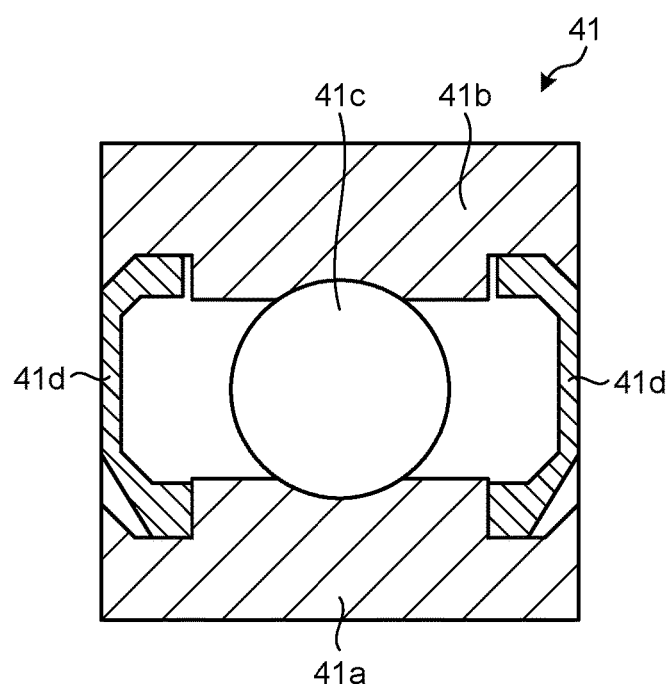
FIG. 3 is a diagram for explaining a structure of a bearing.

The first bearing 41 includes an inner ring 41a, an outer ring 41b, and a rolling element 41c, and is lubricated by grease lubrication. As illustrated in FIG. 3, the first bearing 41 includes a rolling bearing having a seal member 41d. The seal member 41d is attached to the outer ring 41b to contact the inner ring 41a. In other words, the first bearing 41 is a greased bearing with grease sealed inside the seal member 41d. Then, since the outer ring 41b is fixed to the partition 14 and the inner ring 41a is attached to the rotating shaft 4, rotation of the rotating shaft 4 causes slippage (sliding) between the seal member 41d and the inner ring 41a.

The second oil seal 32 is an oil seat that is provided between the first bearing 41 and the second bearing 42 and is located on the gear chamber 22 side with respect to the through hole 15. The second oil seal 32 includes a seal lip part 32a contacting the rotating shaft 4 and a metal ring 32b contacting the partition 14. This allows the second oil seal 32 to seal between the rotating shaft 4 and the partition 14 on the gear chamber 22 side.

Further, the second oil seal 32 is so attached that the seal lip part 32a is located on the gear chamber 22 side and a dust lip is located on the motor chamber 21 side. Thus, even if the lubricating oil 23 in the gear chamber 22 enters a space on the motor chamber 21 side with respect to the second bearing 42, the second oil seal 32 prevents the lubricating oil 23 from further moving to the motor chamber 21 side.

The second bearing 42 includes an inner ring 42a, an outer ring 42b, and a rolling element 42c, and is lubricated by oil lubrication. In other words, the second bearing 42 is a rolling bearing lubricated by the lubricating oil 23 of the gear chamber 22. Since the gear mechanism 3 is lubricated by the scoop based lubrication, the lubricating oil 23 that has been scooped up splashes and is supplied to the second bearing 42. Accordingly, after the lubricating oil 23 of the gear chamber 22 lubricates the second bearing 42, the lubricating oil 23 enters a space between the second bearing 42 and the first bearing 41 in some cases. For such occasion, the second oil seal 32 prevents the lubricating oil 23 from moving to the motor chamber 21 side.

As described above, according to the first embodiment, the first oil seal 31 and the second oil seal 32 provided between the first bearing 41 and the second bearing 42 enable sealing between the motor chamber 21 and the gear chamber 22. This prevents the coolant 24 and the lubricating oil 23 from mixing together.

If the lubricating oil 23 and the coolant 24 mix together, heat generated due to the loss of the gear mechanism 3 is inputted to the coolant 24, which increases the temperature of the coolant 24. The heat input occurs also in a case where a liquid (same liquid) is commonly used in the motor chamber 21 and the gear chamber 22. In contrast, according to the first embodiment, the coolant 24 and the lubricating oil 23, which are different types of liquids, do not mix together, so that the heat due to the loss of the gear mechanism 3 is not inputted to the coolant 24 of the motor chamber 21 side.

Further, since high temperature of the lubricating oil 23 reduces the viscosity of the lubricating oil 23, it is possible to reduce, in the gear chamber 22, a drag (agitation loss) at a section where a rotor such as the gear, the bearing, or the rotating shaft agitates the lubricating oil 23. Thus, the use under a high temperature of the gear chamber 22 side is possible and reduction in agitation loss of the rotor is possible, leading to reduction in loss of the gear mechanism 3. Thereby, the fuel consumption or electricity cost of the drive device 1 is improved.

Further, in the motor 2, if the coil temperature rises, then the electric resistance of the stator coil 2c increases. As a result, in a case where electricity is conducted to the stator coil 2c, Joule heat increases and the loss increases. In contrast, according to the first embodiment, the coolant 24 specializing in cooling properties is used to cool the motor 2, which reduces the temperature of the motor 2. Thus, the use under a low temperature of the motor chamber 21 side is possible, leading to reduction in loss of the motor 2. Thereby, the fuel consumption or electricity cost of the drive device 1 is improved.

Further, according to the first embodiment, in a case where a vehicle mounting the drive device 1 thereon runs under a heavy load, especially, the temperature of the motor 2 can be reduced; therefore, the amount of current per unit area that flows through the motor 2 can be increased by an amount corresponding to the improvement in cooling performance of the motor 2. This makes it possible to downsize the motor 2. Further, the reduction in temperature of the motor 2 makes it possible to use a material with a lower grade of thermal degradation for the permanent magnet 2d, for example. This enables cost reduction.

Further, since the second oil seal 32 is located on the through hole 15 side with respect to the second bearing 42, the second bearing 42 can be lubricated by the lubricating oil 23 in the gear chamber 22. Since the second bearing 42 is lubricated by oil lubrication, there is no slide as compared to a bearing structure with seal lip, so that the loss in the second bearing 42 is reduced. Further, in a case where the lubricating oil 23 enters the through hole 15 side with respect to the second bearing 42, the second oil seal 32 prevents the lubricating oil 23 from further moving to the motor chamber 21 side.

Note that, in this description, concerning the bearing structure, a case where the seal member contacts the inner ring is referred to as "with seal lip" and a case where the seal member does not contact the inner ring is referred to as "without seal lip". In the case of "with seal lip", as illustrated in FIG. 3, the seal member 41d and the inner ring 41a contact each other, which causes slippage between the seal member 41d and the inner ring 41a. On the other hand, in the case of "without seal lip", as illustrated in FIG. 4, the seal member 41d and the inner ring 41a do not contact each other even if the bearing has the seal member 41d, which causes no slippage between the seal member 41d and the inner ring 41a.

Figure 4:
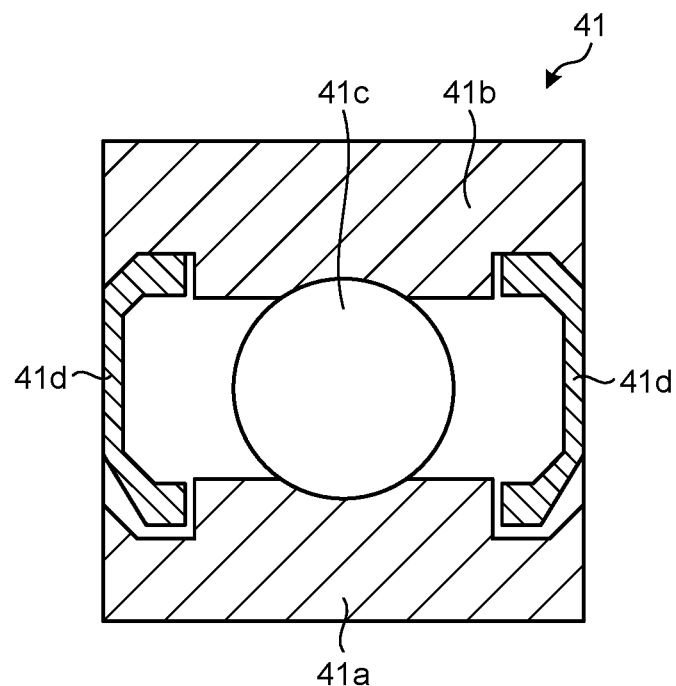
FIG. 4 is a diagram for explaining a bearing without seal lip.

Further, as a variation of the first embodiment, the first bearing 41 may include a bearing without seal lip as illustrated in FIG. 4. The first bearing 41 of the variation has the seal member 41d that is not in contact with the inner ring 41a and is constituted by a grease-lubricated bearing with grease filled in the internal space of the seal member 41d.

Second Embodiment

In a second embodiment, the first seal part is constituted by a mechanical seal instead of the first oil seal 31 of the first embodiment. Note that descriptions of the configuration similar to that of the first embodiment are omitted and reference signs thereof are cited.

Figure 5:
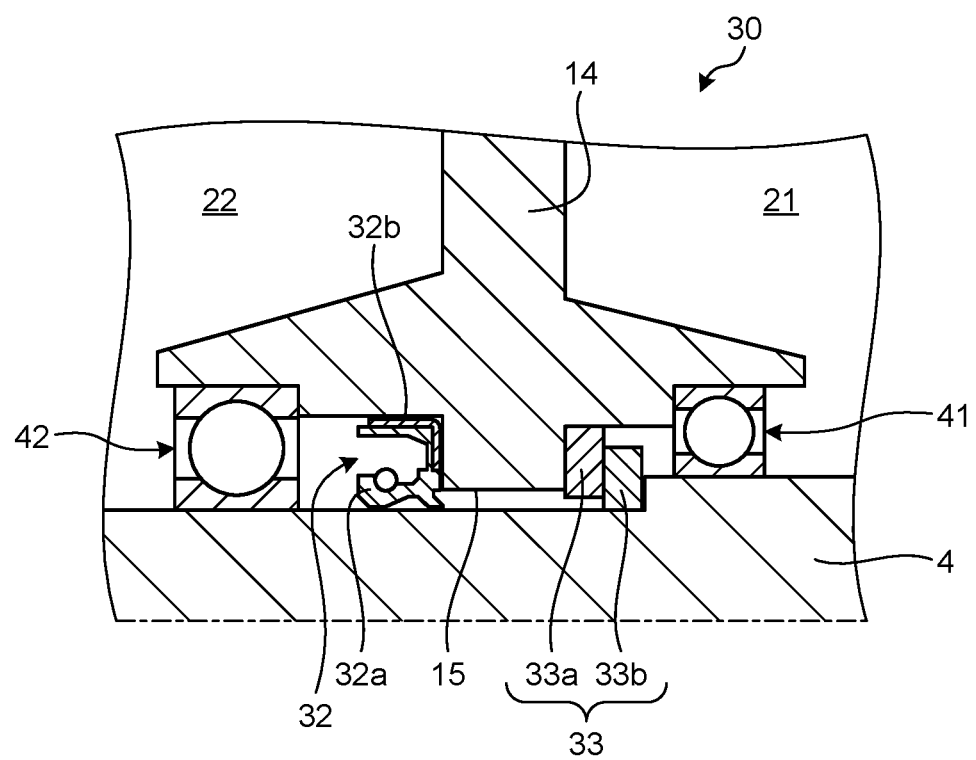
FIG. 5 is a diagram schematically illustrating a seal structure in a second embodiment.

As illustrated in FIG. 5, in the seal structure 30 of the second embodiment, the first seal part is constituted by a mechanical seal 33. The mechanical seal 33 is located between the through hole 15 and the first bearing 41. The mechanical seal 33 includes a stationary ring 33a fixed to the partition 14 and a rotating ring 33b provided in the rotating shaft 4. The stationary ring 33a and the rotating ring 33b are located to face each other in the axial direction. Then, the stationary ring 33a is in contact with a seal surface of the rotating ring 33b. Note that the second oil seal 32 of the second seal part and the second bearing 42 are similar to those of the first embodiment.

Further, the first bearing 41 is a greased bearing with seal lip. Specifically, as illustrated in FIG. 3, the first bearing 41 has a structure in which the seal member 41d is in contact with the inner ring 41a.

As described above, according to the second embodiment, a textured structure of the mechanical seal 33 enables sealing. This improves the sealing performance of the coolant 24 that is a non-lubricating liquid.

As a comparison, since the seal lip part 31a of the first oil seal 31 in the first embodiment is in a state of fluid lubrication and mixed lubrication, if a fluid coming between the seal lip part 31a and the rotating shaft 4 has no lubrication properties, specifically, if the coolant 24 of the motor chamber 21 side comes between the seal lip part 31a and the rotating shaft 4, sliding of the rotating shaft 4 at a high speed increases heat generation, which possibly burns a tip of the lip. If the tip of the lip burns, the sealing performance may not be sufficient. On the other hand, according to the second embodiment, since the mechanical seal 33 ensures the sealing performance at the high rotation, which is suitable in a case where the rotating shaft 4 rotates at a high speed. In short, it is possible to rotate the motor 2 at a higher speed.

Further, since the first bearing 41 is a greased bearing with seal lip, the grease can be used to lubricate the first bearing 41. As a comparison, since a bearing without seal lip has a clearance between the seal member 41d and the inner ring 41a, the grease may be washed away by an electrically insulating coolant 24 and a non-lubricating coolant 24 that is not grease may flow in, which possibly reduces the reliability of the bearing. On the other hand, according to the second embodiment, the first bearing 41 is structured to have a seal lip, which keeps the grease in the first bearing 41 to ensure lubrication properties.

Third Embodiment

A third embodiment differs from the second embodiment in installation location of the mechanical seal 33. Note that, in the descriptions of the third embodiment, descriptions of the configuration similar to that of the second embodiment are omitted and reference signs thereof are cited.

Figure 6:
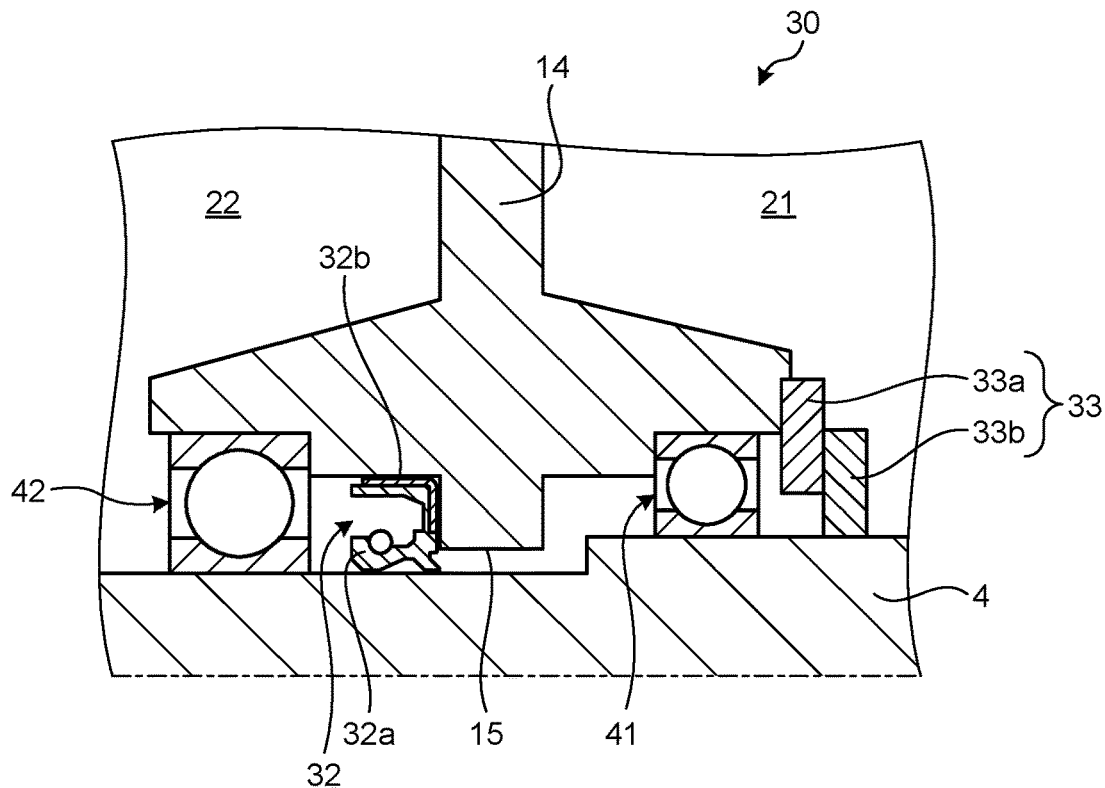
FIG. 6 is a diagram schematically illustrating a seal structure in a third embodiment.

As illustrated in FIG. 6, in the seal structure 30 of the third embodiment, the mechanical seal 33 that is the first seal part is located on the motor chamber 21 side with respect to the first bearing 41. In other words, the mechanical seal 33 is positioned to face the motor chamber 21. The stationary ring 33a is located on a side closer to the first bearing 41. The rotating ring 33b is located on a side far from the first bearing 41.

Further, the first bearing 41 includes a bearing without seal lip. In other words, the first bearing 41 has a structure in which the seal member 41d is not in contact with the inner ring 41a. In the third embodiment, the mechanical seal 33 prevents the coolant 24 of the motor chamber 21 from entering the first bearing 41. Therefore, the seal member of the first bearing 41 can be omitted. In light of the above, the first bearing 41 without seal lip can reduce the loss whereas the bearing with seal lip has a drag at the seal lip part to cause a loss. Further, in the first bearing 41, the seal lip part of the seal member is not burned.

As described above, according to the third embodiment, the loss of the first bearing 41 can be reduced in addition to the effects of the second embodiment.

Fourth Embodiment

In a fourth embodiment, the second seal part has a labyrinth structure instead of the second oil seal 32 of the third embodiment. Note that, in the descriptions of the fourth embodiment, descriptions of the configuration similar to that of the third embodiment are omitted and reference signs thereof are cited.

Figure 7:
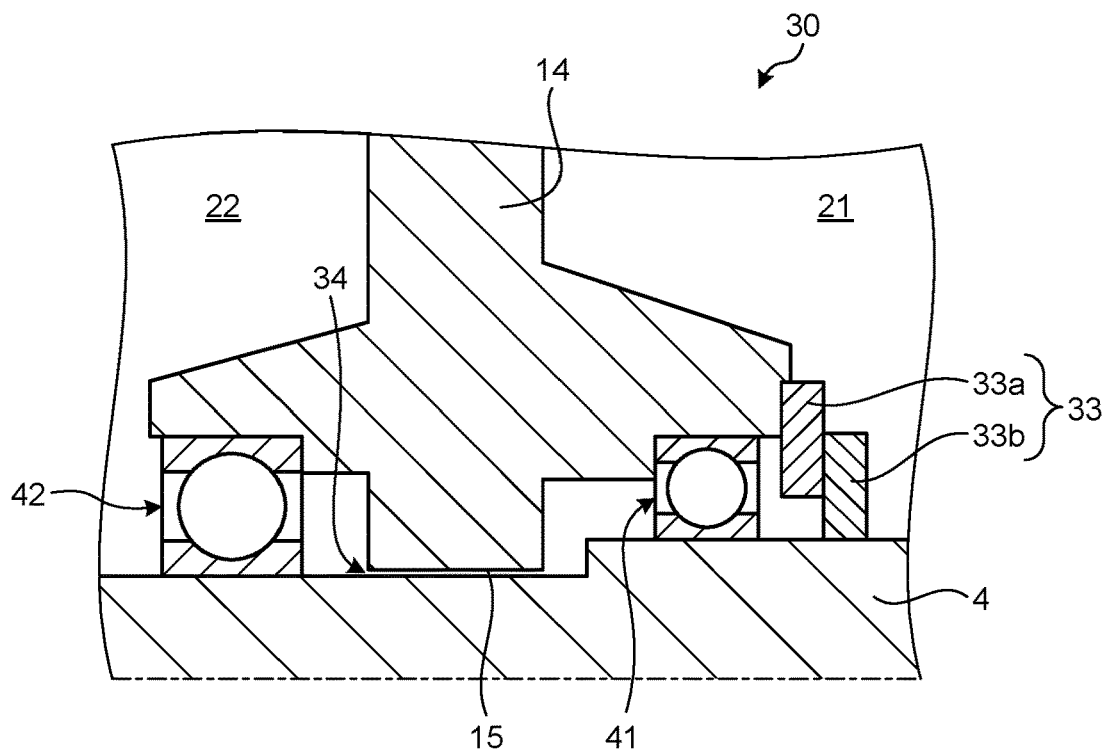
FIG. 7 is a diagram schematically illustrating a seal structure in a fourth embodiment.

As illustrated in FIG. 7, in the seal structure 30 of the fourth embodiment, the second seal part has a labyrinth structure 34. The labyrinth structure 34 is a non-contact seal part, and is structured to have a small clearance between the rotating shaft 4 and the case 10 and to seal a liquid. In the labyrinth structure 34, the rotation of the rotating shaft 4 is used to seal the liquid. The labyrinth structure 34 of the fourth embodiment performs a seal function by a radial clearance between the rotating shaft 4 and the through hole 15. Further, in the example illustrated in FIG. 7, the labyrinth structure 34 has a constant clearance in the radial direction and is formed to extend over a predetermined length in the axial direction.

Here, a comparison between the labyrinth structure 34 and the second oil seal 32 shows that the second oil seal 32 has a large drag and a large loss. On the other hand, according to the fourth embodiment, since the labyrinth structure 34 is a non-contact seal part, the drag loss can be reduced.

As described above, according to the fourth embodiment, since the second seal part is the labyrinth structure 34, the loss can be reduced in addition to the effects of the third embodiment.

Further, the labyrinth structure 34 includes a non-contact seal structure and the shape of the clearance between the rotating shaft 4 and the partition 14 is not particularly limited. For example, the radial clearance of the labyrinth structure 34 does not have to be a constant size. As an example, since the lubricating oil 23 having a high viscosity is harder to enter the clearance than the coolant 24, the labyrinth structure 34 may be formed to have such a shape that the clearance gradually narrows in the axial direction from the gear chamber 22 side to the motor chamber 21 side. In other words, since the coolant 24 has a low viscosity and is easy to enter the clearance, the labyrinth structure 34 may be so formed that the clearance on the motor chamber 21 side is relatively narrow. Further, the labyrinth structure 34 is not limited to the structure illustrated in FIG. 7 and can be formed to have structures illustrated in FIGS. 8 to 10.

Figure 8:
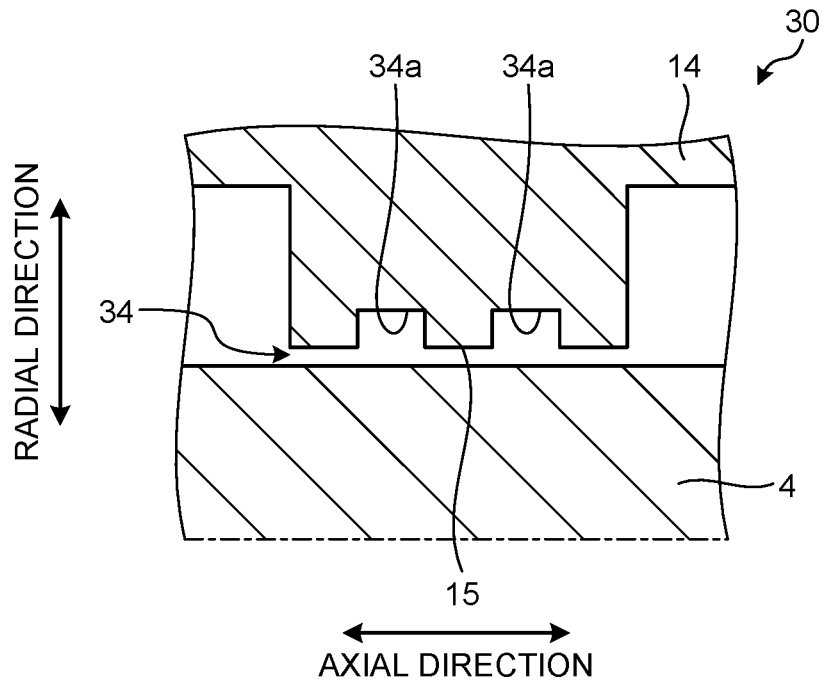
FIG. 8 is a diagram illustrating an example of a labyrinth structure.

As illustrated in FIG. 8, the labyrinth structure 34 has a structure in which a groove 34a is formed in the through hole 15 of the partition 14. In the labyrinth structure 34, a groove may be formed on an outer surface of the rotating shaft 4 of a part radially facing the groove 34a. Further, if a groove is formed on the outer surface of the rotating shaft 4, the groove 34a is not necessarily formed on the through hole 15.

Figure 9:
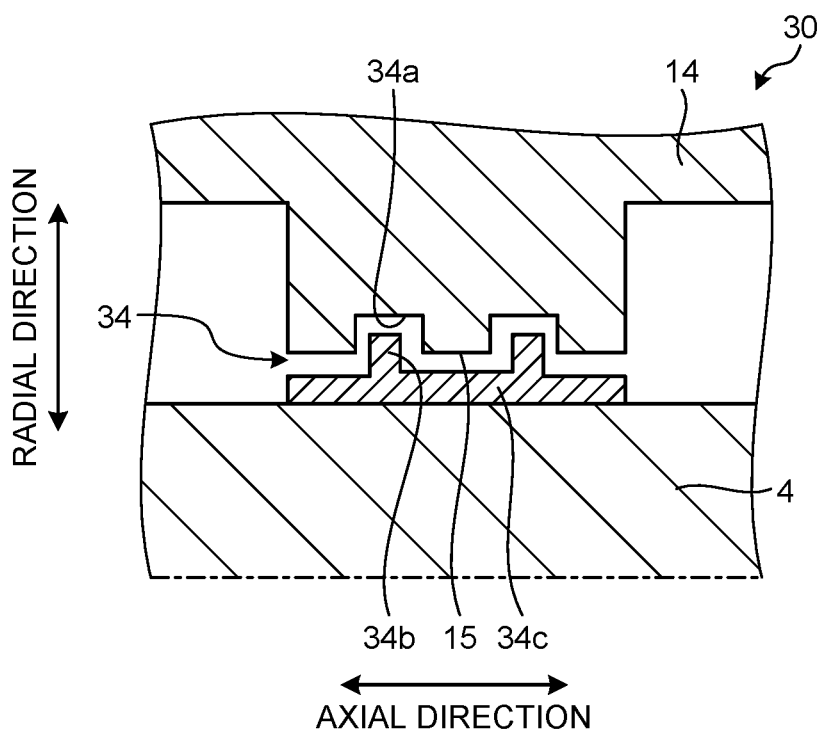
FIG. 9 is a diagram illustrating another example of the labyrinth structure.

As illustrated in FIG. 9, the labyrinth structure 34 has a convex 34b accommodated in the groove 34a and has a structure in which a member 34c having the convex 34b is attached to the rotating shaft 4. The labyrinth structure 34 is a so-called radial labyrinth.

Figure 10:
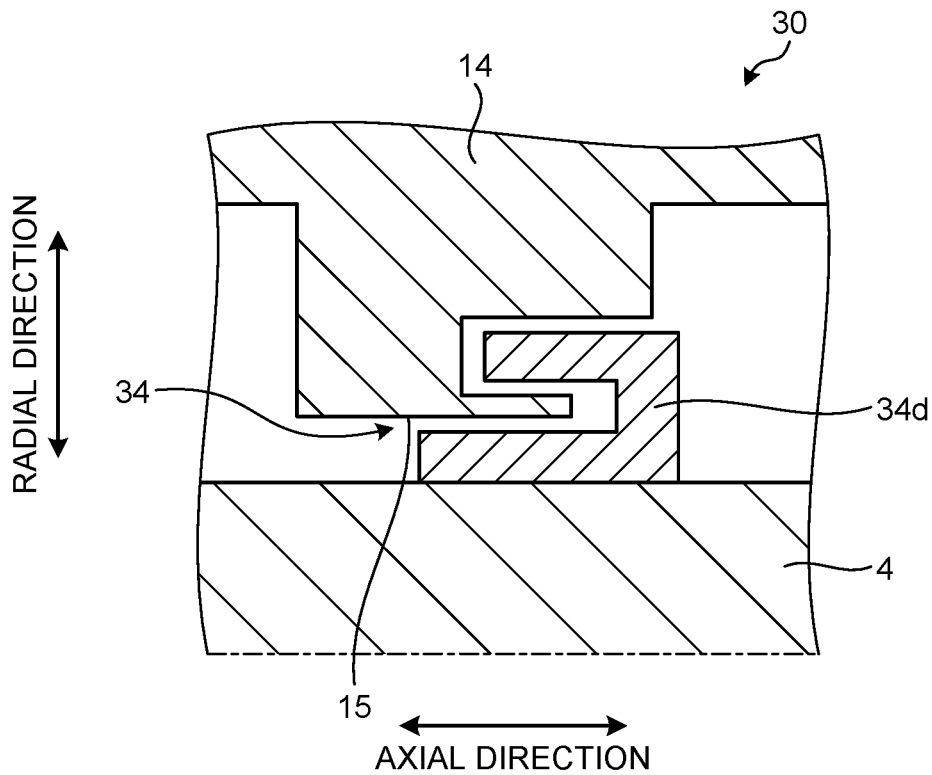
FIG. 10 is a diagram illustrating yet another example of the labyrinth structure.

As illustrated in FIG. 10, the labyrinth structure 34 has a structure in which a labyrinth-like clearance is formed between the partition 14 and a rotating member 34d attached to the rotating shaft 4. The labyrinth structure 34 is a so-called axial labyrinth.

Further, as a variation of the fourth embodiment, the second bearing 42 may be a bearing without seal lip which is lubricated by grease lubrication. Specifically, as illustrated in FIG. 4, the second bearing 42 of the variation includes a bearing having a seal member which is not in contact with the inner ring.

Fifth Embodiment

A fifth embodiment differs from the first embodiment in that the first seal part and the second seal part are constituted by a mechanical seal. Note that, in the descriptions of the fifth embodiment, descriptions of the configuration similar to that of the first embodiment are omitted and reference signs thereof are cited.

Figure 11:
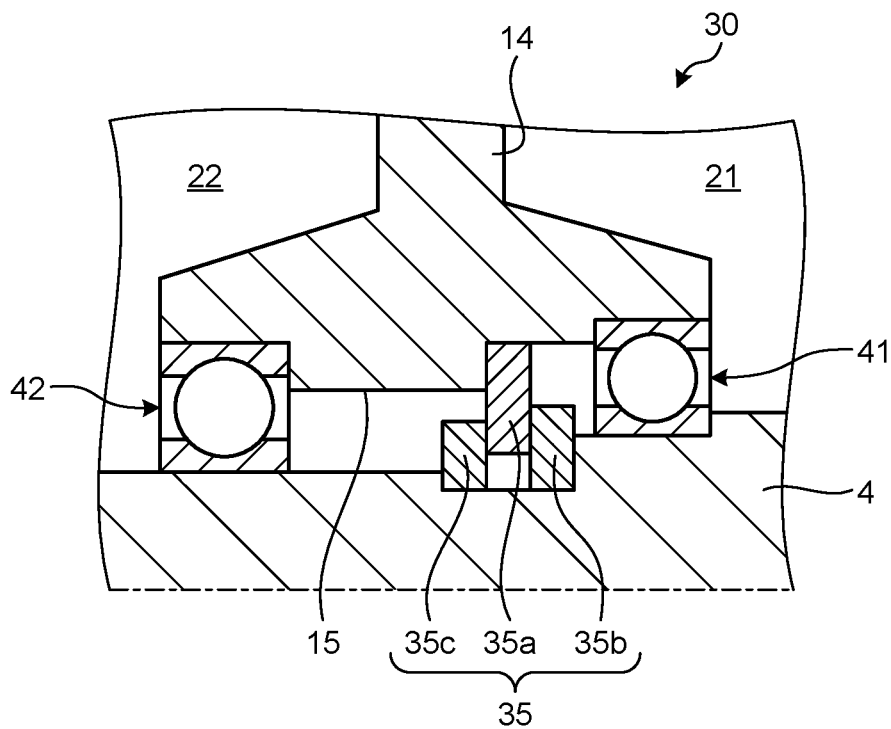
FIG. 11 is a diagram schematically illustrating a seal structure in a fifth embodiment.

As illustrated in FIG. 11, in the seal structure 30 of the fifth embodiment, the first seal part and the second seal part constituted by the mechanical seal 35 are located between the first bearing 41 and the second bearing 42. The first bearing 41 is a bearing without seal lip. The second bearing 42 is an oil lubricated bearing.

The mechanical seal 35 includes a stationary ring 35a fixed to the partition 14, a first rotating ring 35b provided in the rotating shaft 4, and a second rotating ring 35c provided in the rotating shaft 4. In the first seal part and the second seal part, the stationary ring 35a of the mechanical seal 35 is constituted by a common member.

The first seal part includes the stationary ring 35a and the first rotating ring 35b located on the motor chamber 21 side in the axial direction. The second seal part includes the stationary ring 35a and the second rotating ring 35c located on the gear chamber 22 side in the axial direction.

A comparison between the mechanical seal 35 and the oil seal (the first oil seal 31 and the second oil seal 32) shows that the oil seal has a larger drag and a larger loss than the mechanical seal 35 has. Thus, according to the fifth embodiment, the loss can be reduced.

As described above, according to the fifth embodiment, a textured structure of the mechanical seal 35 enables sealing in addition to the effects similar to those in the first embodiment. This improves the sealing performance of the coolant 24 that is a non-lubricating liquid.

In the present disclosure, concerning the structure in which the partition separates the motor chamber and the gear chamber inside the case and the rotating shaft passes through the partition, the first seal part on the motor chamber side and the second seal part on the gear chamber side, which are arranged side by side in the axial direction, seal between the partition and the rotating shaft. This allows the first seal part to prevent the coolant from moving to the gear chamber side and also allows the second seal part to prevent the lubricating oil from moving to the motor chamber side even if the motor chamber and the gear chamber contain different types of liquids. This prevents the coolant in the motor chamber and the lubricating oil in the gear chamber from mixing together.

According to an embodiment, concerning the structure in which the partition separates the motor chamber and the gear chamber inside the case and the rotating shaft passes through the partition, the first seal part on the motor chamber side and the second seal part on the gear chamber side, which are arranged side by side in the axial direction, seal between the partition and the rotating shaft. This allows the first seal part to prevent the coolant from moving to the gear chamber side and also allows the second seal part to prevent the lubricating oil from moving to the motor chamber side even if the motor chamber and the gear chamber contain different types of liquids. This prevents the coolant in the motor chamber and the lubricating oil in the gear chamber from mixing together.

According to an embodiment, a textured structure of the mechanical seal enables sealing. This improves the sealing performance of the coolant that is a non-lubricating liquid.

According to an embodiment, even if the lubricating oil that has lubricated the second bearing enters a space between the second bearing and the first bearing, the oil seal of the second seal part can seal on the gear chamber side.

According to an embodiment, a textured structure of the mechanical seal enables sealing. This improves the sealing performance of the coolant that is a non-lubricating liquid.

According to an embodiment, the labyrinth structure that is a non-contact seal enables sealing. This does not cause sliding with the seal part at the rotation of a rotor, leading to reduction in loss.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A seal structure of a drive device comprising:
   an electric motor;
   a rotating shaft that rotates together with a rotor of the electric motor;
   a gear mechanism connected to the rotating shaft;
   a case in which a motor chamber for accommodating the electric motor and a gear chamber for accommodating the gear mechanism are adjacent to each other;
   a partition that has a through hole into which the rotating shaft is inserted and separates the motor chamber and the gear chamber in the case;
   a bearing that is attached to the partition to rotatably support the rotating shaft inserted in the through hole;
   a seal part that is in line with the bearing in an axial direction of the rotating shaft to seal between the rotating shaft and the partition;
   a lubricating oil that lubricates the gear mechanism inside the gear chamber; and
   a coolant that cools the electric motor inside the motor chamber, the coolant being a different type of liquid from the lubricating oil, wherein
   the bearing includes
      a first bearing located on the motor chamber side with respect to the through hole, and
      a second bearing located on the gear chamber side with respect to the through hole,
   the seal part includes
      a first seal part, and
      a second seal part located on the gear chamber side with respect to the first seal part, with each of the first seal part and the second seal part being between the partition and the rotating shaft, and
   the second seal part is between the first bearing and the second bearing.

2. The seal structure of the drive device according to claim 1, wherein
   the first seal part is a mechanical seal between the first bearing and the second bearing, and
   the mechanical seal includes
      a rotating ring on the rotating shaft, and
      a stationary ring that is in contact with the rotating ring and is fixed to the partition.

3. The seal structure of the drive device according to claim 2, wherein
   the second seal part includes a seal lip part that is in contact with the rotating shaft, and
   the second bearing is a rolling bearing lubricated by the lubricating oil.

4. The seal structure of the drive device according to claim 1, wherein
   the first seal part is a mechanical seal on the motor chamber side with respect to the first bearing, and
   the mechanical seal includes
      a rotating ring on the rotating shaft, and
      a stationary ring that is in contact with the rotating ring and is fixed to the partition.

5. The seal structure of the drive device according to claim 4, wherein the second seal part is constituted by a labyrinth structure.

* * * * *